United States Patent
Goltz et al.

(10) Patent No.: US 10,353,692 B2
(45) Date of Patent: Jul. 16, 2019

(54) METHOD FOR UPDATING A CONTROL UNIT FOR AN AUTOMOTIVE VEHICLE, CONTROL UNIT FOR AN AUTOMOTIVE VEHICLE, AND COMPUTER PROGRAM PRODUCT

(71) Applicant: OpenSynergy GmbH, Berlin (DE)

(72) Inventors: Christian Goltz, Berlin (DE); Wolfgang Smidt, Berlin (DE)

(73) Assignee: OpenSynergy GmbH, Berlin (DE)

( * ) Notice: Subject to any disclaimer, the term of this patent is extended or adjusted under 35 U.S.C. 154(b) by 48 days.

(21) Appl. No.: 15/578,724

(22) PCT Filed: Jun. 1, 2016

(86) PCT No.: PCT/EP2016/062320
§ 371 (c)(1),
(2) Date: Dec. 1, 2017

(87) PCT Pub. No.: WO2016/193278
PCT Pub. Date: Dec. 8, 2016

(65) Prior Publication Data
US 2018/0173515 A1    Jun. 21, 2018

(30) Foreign Application Priority Data
Jun. 1, 2015 (EP) .................................. 15170139

(51) Int. Cl.
*G06F 8/65* (2018.01)
*G06F 11/14* (2006.01)
(Continued)

(52) U.S. Cl.
CPC .............. *G06F 8/65* (2013.01); *G06F 9/4406* (2013.01); *G06F 9/45558* (2013.01);
(Continued)

(58) Field of Classification Search
CPC ...... G06F 8/65; G06F 9/4406; G06F 11/1433; G06F 21/64; G06F 1209/45587; G06F 2221/034; H04L 63/0838; H04L 67/34
See application file for complete search history.

(56) References Cited

U.S. PATENT DOCUMENTS 6,874,680 B1 * 4/2005 Klaus ........................ G06F 8/65
235/375
2008/0288941 A1 * 11/2008 Adams ................ G06F 9/45558
718/1

(Continued)

OTHER PUBLICATIONS

Shaya Potter et al., "Secure Isolation of Untrusted Legacy Applications", [Online], 2007, pp. 1-16, [Retrieved from Internet on Mar. 11, 2019], <https://www.usenix.org/legacy/event/lisa07/tech/full_papers/potter/potter_html/>.*

(Continued)

*Primary Examiner* — Ziaul A Chowdhury
(74) *Attorney, Agent, or Firm* — Soquel Group LLC

(57) ABSTRACT

The present invention relates to a method for updating a control unit (1) for an automotive vehicle, the control unit comprising a runtime system (22, 122) with a virtualization layer (32, 132) adapted to run on the processor (3), the virtualization layer being adapted to assign processor time and memory space to a plurality of guest systems (24, 26, 28, 30, 124, 126, 128, 130, 158), the method comprising: downloading (1018), by a first update client (38, 40, 138, 140) of a first untrusted guest system (26, 28) running on the virtualization layer (32, 132), one or more first update files or data segments from a first remote server (44, 46, 48, 144, 146, 148); storing, by the first update client (38, 40, 138, 140), the one or more first update files or data segments in an untrusted memory (5) accessible to the first untrusted guest system; running an update operating system (58, 158) adapted to update one or more files or data segments of the (Continued)

control unit; retrieving, by the updating operating system (58, 158), the one or more first update files or data segments from the untrusted memory (5); and updating (1108, 1110, 1112, 1114) the one or more files or data segments of the control unit (1).

16 Claims, 7 Drawing Sheets

(51) Int. Cl.
*G06F 9/4401* (2018.01)
*G06F 21/57* (2013.01)
*G06F 21/64* (2013.01)
*G06F 9/455* (2018.01)
*H04L 29/06* (2006.01)
*H04L 29/08* (2006.01)

(52) U.S. Cl.
CPC .......... *G06F 11/1433* (2013.01); *G06F 21/57* (2013.01); *G06F 21/64* (2013.01); *H04L 63/0428* (2013.01); *H04L 63/0838* (2013.01); *H04L 67/34* (2013.01); *G06F 2009/45587* (2013.01); *G06F 2221/034* (2013.01)

(56) References Cited

U.S. PATENT DOCUMENTS

| | | | |
|---|---|---|---|
| 2011/0126218 A1* | 5/2011 | Kishita | G06F 9/545 |
| | | | 719/321 |
| 2011/0154500 A1* | 6/2011 | Sahita | G06F 21/57 |
| | | | 726/26 |
| 2011/0237234 A1 | 9/2011 | Kotani et al. | |
| 2013/0219170 A1* | 8/2013 | Naitou | H04L 63/0428 |
| | | | 713/153 |
| 2014/0075197 A1 | 3/2014 | Alrabady et al. | |
| 2014/0351911 A1* | 11/2014 | Yang | H04L 63/0838 |
| | | | 726/7 |
| 2016/0224806 A1* | 8/2016 | Takada | G06F 21/64 |
| 2016/0328272 A1* | 11/2016 | Ahmed | G06F 9/4881 |
| 2016/0366646 A1* | 12/2016 | Yun | G06F 9/4406 |
| 2016/0371076 A1* | 12/2016 | Moeller | H04L 67/34 |
| 2017/0242801 A1* | 8/2017 | Sangameswaran | |
| | | | G06F 11/1433 |
| 2018/0203715 A1* | 7/2018 | Granado | G06F 8/656 |
| 2018/0281598 A1* | 10/2018 | Shu | G05B 19/0428 |

OTHER PUBLICATIONS

Farzad Sabahi et al., "Virtualization-Level Security in Cloud Computing", [Online], 2011, pp. 250-254, [Retrieved from Internet on Mar. 11, 2019], <https://ieeexplore.ieee.org/stamp/stamp.jsp?tp=&arnumber=6014716>.*

Nilsson et al., "A Framework for Self-Verification of Firmware Updates over the Air in Vehicle ECUs", IEEE Globecom Workshops, Nov. 30-Dec. 4, 2008, IEEE, New Jersey, USA.

Scheibel et al., "Design and Implementation of an Architecture for Vehicular Software Protection", Embedded Security in Cars Workshop, Jan. 1, 2006. http://www.marko-wolf.de/files/ScStWo06.

EP 15170139, European Search Report, dated Oct. 20, 2015, 6 pages.

PCT/EP2016/062320, International Search Report, dated Aug. 11, 2016, 6 pages.

PCT/EP2016/062320, Written Opinion, dated Aug. 11, 2016, 6 pages.

* cited by examiner

METHOD FOR UPDATING A CONTROL UNIT FOR AN AUTOMOTIVE VEHICLE, CONTROL UNIT FOR AN AUTOMOTIVE VEHICLE, AND COMPUTER PROGRAM PRODUCT The present invention generally relates to a method for an automotive vehicle, the control unit comprising a runtime system with a virtualization layer adapted to run on the processor, the virtualization layer being adapted to assign processor time and memory space to a plurality of guest systems.

Further, the present invention relates to a computer program product comprising commands for executing such a method.

Additionally, the present invention generally relates to a control unit for an automotive vehicle comprising at least one processor connected to at least one untrusted memory and a runtime system running on the control unit.

Most existing software systems have a basic software update mechanism that covers flash updates, file updates and status querying, for example the Android recovery system.

A software component in a system that is privileged to execute updates is a critical software component. It is able to change the software on the running system and has to be protected from outside attacks.

In modern systems, software updates may be downloaded over a network, so there has to be a way for an update mechanism to receive data over a network. The way this data is received has to ensure that the received data is valid and that no unauthorized application can hijack the privileges of the update mechanism.

For example in some systems, the update mechanism itself is allowed to create a connection to a backend and introduce a large attack vector into the update mechanisms. Bugs and design errors in the software for the backend connection may result in an attacker taking over the update mechanism.

Also other designs specifically introduce one specific component for downloading data from a backend over one or several specific channels. When this component fails, the update mechanism may not be able to receive updates anymore.

Further, the state of the art does not take in account that the signals that are fed into the ECU system supervisor may go through untrusted guest systems or networks. Thus, the signal data arriving at the ECU system supervisor cannot be trusted to be valid in any way. Untrusted guest systems or systems in the network may change signals, replay signals or read signal content.

Object of the invention is to improve the capability of a control unit to receive trusted updates and to ensure that the security is maintained at a high level. In light of the above, a method for updating a control unit for an automotive vehicle is provided, the control unit comprising a runtime system with a virtualization layer adapted to run on the processor, the virtualization layer being adapted to assign processor time and memory space to a plurality of guest systems, the method comprising:

downloading, by a first update client of a first untrusted guest system running on the virtualization layer, one or more first update files or data segments from a first remote server;

storing, by the first update client, the one or more first update files or data segments in an untrusted memory accessible to the first untrusted guest system;

running an update operating system adapted to update one or more files or data segments of the control unit;

retrieving, by the updating operating system, the one or more first update files or data segments from the untrusted memory; and updating the one or more files or data segments of the control unit.

According to particular embodiments, the method may have the following features, which may be combined in any technical feasible combination:

initiating a reboot, by a first trusted guest system running on the virtualization layer, of the control unit;

after reboot, starting an updating system comprising the update operating system;

downloading, by a second update client of a second untrusted guest system running on the virtualization layer, a one or more second update files or data segments from a second remote server or the first remote server;

storing, by the second update client, the one or more second update files or data segments in the untrusted memory;

retrieving, by the updating operating system, the one or more second update files or data segments from the untrusted memory; and selecting, by the updating operating system, the one or more files or data segments to be used for the update from the one or more first update files or data segments and the one or more second update files or data segments;

before downloading, by the first untrusted guest system, one or more first update files or data segments:

initiating a download of one or more first update files or data segments by a second update client of a second untrusted guest system, upon failure to download one or more update files or data segments by a second untrusted guest system, initiating a download of the one or more first update files or data segments by the first untrusted guest system;

updating one or more files or data segments of the control unit includes updating one or more files or data segments of the runtime system and/or update system;

verifying, in particular by the updating operating system, the one or more first and/or second update files or data segments;

a reboot of the control unit is initiated by the first trusted guest system of the control unit after reception of a reboot signal, the method further comprising: receiving, by the first trusted guest system, the reboot signal from a remote server in particular the first and/or second remote server or a boot of the update operating system on the virtualization layer is initiated by the first trusted guest system of the control unit after reception of an update command, the method further comprising: receiving, by the first trusted guest system, the update command from a remote server, in particular the first and/or second remote server;

the one or more signals, in particular the reboot signal or update command, received by the first trusted guest system is encrypted by the remote server, in particular with a one-time password, and decrypted by the first trusted guest system;

generating a shared secret by the first trusted guest system;

sending the shared secret to the remote server;

receiving, by the first trusted guest system, the one or more signals, in particular the reboot signal, encrypted with the one-time password based on the shared secret;

verifying, by the first trusted guest system, whether one-time password is correct; and, if the one-time password is correct, executing the signal command.

the first trusted guest system communicates to the remote server via one of the first or second untrusted guest systems, in particular via an encrypted communication channel.

the first trusted guest system runs a system supervisor server, the system supervisor server providing the state of the control unit and/or of the other guest systems to the guest systems, wherein, in particular, the states of the control unit include one or more states of the automotive vehicle, one or more states of a system which the ECU is part of, or one or more states of other devices of the system or the automotive vehicle the ECU is part of, wherein, for example, the updating and/or initialization of the reboot depends on the fulfillment of one or more predefined rules, including one or more predefined states of the control unit, in particular one or more states of the automotive vehicle, one or more states of a system which the ECU is part of, or one or more states of other devices of the system or the automotive vehicle the ECU is part of; and/or the first trusted guest system runs a system supervisor server, the system supervisor server having a privilege to reboot the control unit.

According to a further aspect, a computer program product is provided comprising commands for executing the method according an embodiment disclosed herein, when loaded and executed on a processor. According to an embodiment a computer program product may be a physical software product, for example a hard disc, a solid state disc, a CD-ROM, a DVD, comprising the program.

According to other aspects, the present invention relates to non-volatile memory, for example a hard disc, a solid state disc, a CD-ROM, a DVD, including a program containing commands for executing the method according an embodiment disclosed herein, when loaded and executed on a processor.

In light of the above, a control unit is provided comprising at least one processor connected to at least one untrusted memory; a runtime system running on the control unit, the first system comprising: a virtualization layer adapted to run on the processor, the virtualization layer being adapted to assign processor time and memory space to a plurality of guest system; a first untrusted guest system running on the virtualization layer, the first untrusted guest system comprising a download client and being adapted to download one or more first update files or data segments from a first remote server and to store the one or more first update files or data segments in the at least one untrusted memory accessible to the first untrusted guest system; and an update operating system adapted to retrieving, one or more first update files or data segments from the untrusted memory and to update one or more files or data segments of the control unit.

According to particular embodiments, the control unit is adapted to perform a method according to one embodiment disclosed herein.

According to the invention, the designed software update solution provides a secure update mechanism for multiple concurrently running guest systems on one electronic control unit (ECU), a secondary microcontroller unit (MCU) on the ECU and multiple ECUs.

Further, the invention reduces the risk that the update system itself cannot be overtaken by an attack over a network connection to a remote update server.

The invention allows the failure of single update clients while other update clients can still be working.

In a system having a virtualization layer, the update system can only be started by a command from a secure system supervisor server, thus ensuring that no attacker from the unsecure system can trigger the update. The secure system supervisor is separated by the virtualization layer from other guest systems.

Pulling the software update files or data segments into the update system by the update system itself ensures that untrusted components like the software update clients are not able to access critical memory areas.

Further advantages, features, aspects and details are evident from the dependent claims, the description and the drawings.

So that the manner in which the above recited features of the present invention can be understood in detail, a more particular description of the invention, briefly summarized above, may be read by reference to embodiments. The accompanying drawings relate to embodiments of the invention and are described in the following:

Figure 1:
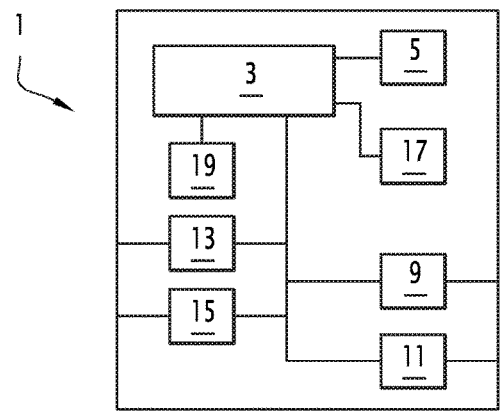
FIG. 1 shows schematically the hardware of an electronic control unit (ECU)

FIG. 1 shows schematically an electronic control unit (ECU) 1. The ECU 1 might be also called control unit in the present patent application. For example, the ECU 1 is realized as a system on chip (SoC). According to an embodiment, an ECU comprises one or more processors 3 connected to one or more untrusted memories 5. Further, the ECU 1 may comprise interface for connecting to one or more bus systems, for example one or more hardware controller 9 for controller area network (CAN) busses and/or one or more hardware controller 11 for FlexRay busses. The ECU may also comprise further hardware controller for connecting to one or more wireless connecting means, for example a Bluetooth connection and/or to a USB (Universal Serial Bus) connecting means. CAN and FlexRay bus systems are dedicated for use in automotive vehicles.

Usually, an automotive vehicle comprises a plurality of electronic control units (ECU), which may be assigned to different units of the vehicle, for example the steering wheel, the brakes, the windows, the motor etc. For example, the ECU may be connected to some sensors or drivers via an interface 13, for example to drive the window, or to sense the angulation of the steering wheel, the level of oil or water in the motor. Some ECUs are providing information for the user of the vehicle, for example information about the status of the vehicle, for example the angulation of the steering wheel, temperature information, the use the status of the vehicle to display enhanced information, and the like. These ECUs may be connected to one or more displays via one or more display ports 15.

Finally, the ECU may comprise may comprise one or more trusted memories 17. For example, the trusted memories are persistent memories. According to an embodiment, at least one, in particular all of the trusted memories are arranged in a security module having a housing. According to an embodiment, the security module destroys all data in the one or more trusted memories 17, if somebody tries to access into the housing. For example, the one or more trusted memories 17 is or are adapted to store one or more stores of trusted certificate authorities, one or more private keys of the ECU, one or more public keys of the ECU, one or more algorithms used for encryption, one or more signature keys of software allowed to run on the ECU.

According to an embodiment, the at least one trusted memory 17 is a read only memory. According to other embodiments, the at least one trusted memory 17, in particular the read only memory may only be written by trusted and/or defined (authorized) operating systems. In contrast, the at least one untrusted memory 5 may be accessed by all operating systems running on the ECU 1.

Further, the ECU comprises one or more persistent memory 19, for example a flash memory, in which the operating system(s), a bootloader and/or at least one virtualization layer of the ECU 1 are stored.

According to an embodiment, the ECU 1 is provided as an embedded system in a vehicle.

Figure 2:
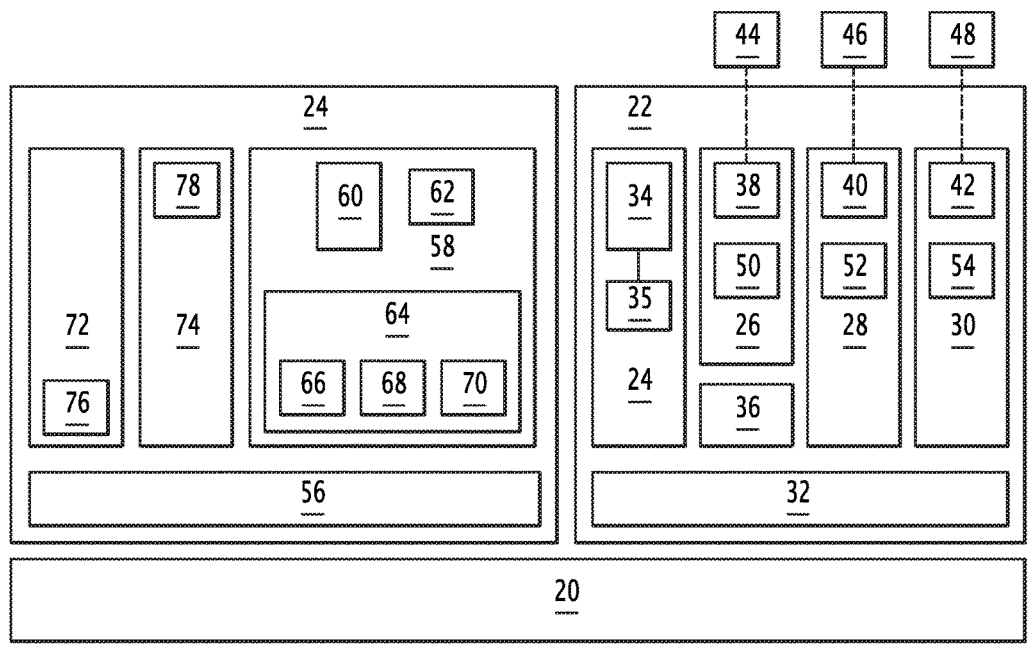
FIG. 2 shows schematically a system according to an embodiment of the invention.

FIG. 2 shows the architecture of the system according to an embodiment of the invention. The system comprises a bootloader 20. The bootloader 20 is adapted to load either a runtime system 22 or an update system 24. The bootloader 20 is signed. In other words, before loading the bootloader 20, the ECU 1 is adapted to compare the signature of the bootloader 20 with a signature stored in the trusted memory 17. If the bootloader 20 is trusted, the bootloader 20 loaded in the memory.

The runtime system 22 comprises a plurality of guest systems 24, 26, 28, 30, for example guest operating systems, each running on a separate partition. The guest systems 24, 26, 28, 30 are running via a virtualization layer 32, for example a microkernel or a hypervisor, on the microprocessor 3 of the ECU. In other words, the virtualization layer 32 enables several operating systems 24, 26, 28, 30 to run on the microprocessor 3.

One example of a virtualization layer 32 is a hypervisor between the hardware, for example a system on chip (SoC), and guest systems 24, 26, 28, 30. The hypervisor runs directly on the hardware, in particular a processor 3, to control the hardware and manages the guest systems. The hypervisor provides and defines a simulated hardware of guest systems installed. Further, the hypervisor assigns the hardware resources to the respective guest systems.

Another example of a virtualization layer 32 is a microkernel operating system, which is used as a virtualization layer between the hardware and guest systems 24, 26, 28, 30. The microkernel runs directly on the hardware. A microkernel is a minimal operating system construct, which makes mechanisms available in order to implement operating system services. This comprises substantially: the management of the address space, the provision and management of mechanisms for separating program sections and their thread management and scheduling, and mechanisms for communication between different guest systems or partitions (inter-partition-communication (IPC)).

The virtualization layer is adapted to assign the hardware resources to the respective guest systems and to provide inter partition communication (IPC) links between the different guest systems 24, 26, 28, 30.

According to an embodiment, the virtualization layer 32 is loaded using a secure boot mechanism. In other words, the bootloader 20 is adapted to verify the image of the virtualization layer 32 before the virtualization layer 32 is started. Therefore, the virtualization layer 32 is a trusted component.

The runtime system 22 comprises a first trusted guest system 24 among the plurality of guest systems. In other words, the trusted guest system 24 is loaded using a secure boot mechanism. For example, the virtualization layer 32 is adapted to verify the image of the trusted guest system 24, for example by verifying a signature of the trusted guest system with a signature stored in the at least one trusted memory 17, e.g. using a public key or asymmetric cryptography. Only if this verification is positive, the trusted guest system is loaded by the processor 3. In other words, a trusted guest system is loaded in a chain of trust, in which each layer verifies before loading a signature of the next higher layer, for example by verifying it with a signature or another key stored in the at least one trusted memory 17, e.g. using a public key or asymmetric cryptography.

According to an example, the trusted guest system 24 is a real-time operating system or a minimal operating system.

The trusted guest system 24 is not able to be directly connected to a remote server. For that purpose, the trusted guest system is not provided with a communication device driver, for example a (wireless) network driver, a USB driver, or an automotive field bus driver. The trusted guest system 24 is adapted to communicate only via a inter partition communication link and other partitions or guest systems to the remote server.

The trusted guest system 24 is adapted to run a system supervisor server 34 for the ECU 1. For example, the system supervisor server 34 defines the boot sequence of the different guest systems 26, 28, 30 and may also stop or reboot them. Further, the system supervisor server 34 is adapted to control whether the ECU (re-) boots with the runtime system 22 or with the update system 24. Further, the system supervisor server 34 provides information about the actual state of the ECU 1 and the guest systems 24, 26, 28, 30, to the (other) guest systems 26, 28, 30. Which states are provided to the other guest systems depends on a configuration of the system supervisor server 34. For example, the system supervisor server 34 is adapted to receive the states or information for a state change of the other guest systems 26, 28, 30 via a in inter partition communication (IPC) link. According to an embodiment, the system supervisor server 34 only reboots the ECU after having received a reboot signal from outside, for example from a remote server and/or a user.

According to an embodiment, the system supervisor server 34 is adapted to receive information about the current state of the vehicle, for example whether the vehicle is driving, whether the vehicle is parked, whether the motor is running, or whether the vehicle is in a garage for repairing the car. This information may be stored as a state of the ECU.

The states of the ECU include one or more states of the vehicle, one or more states of a system which the ECU is part of, or one or more states of other devices of the system or vehicle the ECU is part of, for example of other devices of the vehicle; e.g. whether the motor is running or not, whether the air conditioning is running or not, whether the vehicle is parking, whether the vehicle is moving, etc.

According to an embodiment, which may be combined with other embodiments disclosed herein, the system supervisor server 34 may only reboot the ECU and/or initiate an update of the ECU when one or more rules are fulfilled, i.e. allow a reboot and/or an update. For example, the rules may be programmable and/or updatable. In a specific example, the one or more rules allow a reboot and/or initiate an update in case of one or more predefined states of the vehicle and or of the ECU. In other words, the system supervisor server 34 governs an update process, as described here-below, in dependence of the one or more programmable and/or updatable rules.

In an embodiment, the system supervisor server 34 may only reboot the ECU and/or initiate an update of the ECU, when the vehicle is parked or is in a garage for repairing and/or the engine is not running. Thus, an update of one or more files or data segments may be started only in dependence of a specific state of the vehicle.

Further, the trusted guest system 24 is adapted to monitor the health of the ECU and/or the runtime system during runtime.

The virtualization layer 32 is used to ensure restricted hardware access within the runtime system 22. For example, the virtualization layer 32 is adapted to provide only the trusted guest systems or only a specific trusted guest system, for example the trusted guest system 24, in particular the system supervisor server 34, access to the trusted memory 17, which may be a persistent memory.

Further, the trusted guest system 24 comprises a signal crypto module 35, which is adapted to communicate via an untrusted guest system with a remote server or backend using an encrypted channel, for example using an asymmetric encryption like RSA. The signal crypto module 35 is adapted to encrypt signals, to decrypt signals, to generate shared secrets for a one-time password and/or to check one time passwords. In particular the crypto module 35 is adapted to provide the decrypted signals or commands to the system supervisor server 34.

Further, the runtime system 22 comprises a plurality of untrusted guest systems 26, 28, 30. For example, the first untrusted guest system 26 is an Android operating system, the second untrusted guest system 28 is a Linux operating system, and the third untrusted guest system 30 is an automotive operating system. Further, the runtime system 22 may comprise a partition 36 for an Android recovery system. The number of partitions and of untrusted guest systems is not limited to a specific number. For example, the runtime system 22 may even comprise four or more untrusted guest systems. According to an embodiment, the untrusted guest systems comprise at least two different, in particular at least three different operating systems. Untrusted guest systems are not loaded according to a chain of trust.

According to an embodiment, the virtualization layer 32 is adapted to do not provide the untrusted guest system access to the trusted memory 17.

An automotive guest system is a real time (operating) system, which enables the treatment of data in real time. Due to security constraints, such an automotive guest system is a statically configured system. In other words, the automotive guest system is not changed during runtime. For example, a real time (operating) system has predefined or guaranteed response times. According to an embodiment, they may have predictable response times and behavior, in particular for the scheduling and the memory management. For example, in an embodiment, the automotive guest system comprises or consists of defined components. In other words each component of the automotive guest system has predefined application program interfaces (API) and characteristics which enables interoperability between software and/or hardware of different manufacturers.

One example for such an automotive specific guest system is an operating system configured according to the AUTomotive Open System Architecture (AUTOSAR) standard.

In another embodiment, which may be combined with other embodiments disclosed herein, some of the guest systems 26, 28, 30 may be loaded using a secure boot mechanism, like the trusted guest system 24. For example the automotive operating system 30 is adapted to be loaded using secure boot mechanism or a chain of trust like the trusted guest system 24. Then also the guest system 30 is a trusted guest system.

Each of the guest systems 26, 28, 30 is adapted to be connected to a remote server, for example via a network or a bus connection.

Each of the guest systems 26, 28, 30 comprises an update client 38, 40, 42 which is respectively adapted to download update files or data segments. In particular, each update client may download one or more update files or data segments from a different remote server 44, 46, 48. In other embodiments the remote server 44, 46, 48 is one single remote server, which is accessed by the different guest systems 26, 28, 30 via different or the same connections, for example Bluetooth, GSM, CAN, Ethernet, etc. For example, at least one of the remote server might be located at an automotive manufacturer, an automotive supplier or at a garage for repairing automotive vehicles. In an embodiment, the remote server is located outside the automotive vehicle in which the ECU 1 is arranged.

Further, according to an embodiment, each of the guest systems 26, 28, 30 comprises respectively a system supervisor client 50, 52, 54, which communicates with the state manger server 34 of the trusted guest system 24, in particular via an IPC link.

The update system 24 comprises, optionally, a virtualization layer 56, which may be a hypervisor or a microkernel like the virtualization layer 32.

According to an embodiment, the virtualization layer 56 is loaded using a secure boot mechanism or a chain of trust as already discussed with respect to the trusted guest system 24. In other words, the bootloader 20 is adapted to verify the image of the virtualization layer 56 before the virtualization layer 56 is started, and starts it only if the verification is positive.

Further, the update system 24 includes an update operating system 58, which comprises a system supervisor server 60, similar to the system supervisor server 34. The system supervisor server 60 provides information about the actual state of the ECU 1 and the guest systems 24, 26, 28, 30 and optionally also of the update operating system 58. Which states are provided to the other guest systems depends on a configuration of the system supervisor server 60. For that purpose the update operating system 58 comprises a system supervisor client 62. For example, the system supervisor server 60 defines the boot sequence of the different guest systems 58, 72, 74 and may also stop or reboot them. Further, the system supervisor server 60 is adapted to force the ECU 1 to boot with the runtime system 22 or with the update system 24.

According to an embodiment, the virtualization layer 56 is adapted to provide only the trusted guest system, in particular the system supervisor server 60, access to the trusted memory 17, which may be a persistent memory.

Further, the update operating system 58 comprises an update framework or update manager 64 which is adapted to verify the one or more update files or data segments, for example images, to extract the images or files, to apply the images or files and to execute update scripts. For that purpose the update framework 64 may comprise a microcontroller unit (MCU) installer 66, a flash installer 68 and/or a file system installer 70. The update manager 64 may also comprises other components for updating the ECU 1. According to an embodiment, if several update files or data segments are provided concerning the same module, the update manager 64 may select one of them.

According to an embodiment, the update operating system 58 is a Linux system.

The update system may optionally comprise an automotive operating system 72 and optionally a further download system 74. For example the automotive operating system 72 may be an operating system like the automotive operating system 30. In particular the automotive operating system 72 may comprise an automotive field bus driver 76, for example a (Controller Area Network) CAN driver so that the automotive operating system is adapted to keep a diagnostic session alive.

The download operating system 74 includes a download client 78 which is adapted to download one or more files or data segments, if the runtime system does not work, from any reasonable backend.

Thus, the update system 24 is adapted to have a health monitoring and provides as a fall back system, an emergency download system.

In case the update system 24 includes only the update operating system 58 it is not necessary to provide the virtualization layer 56.

In the following the update method will be described in more detail.

Figure 3:
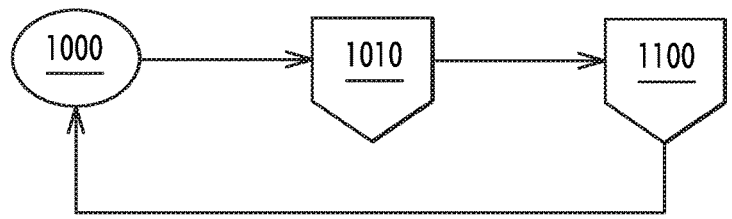
FIG. 3 shows schematically a flow chart of steps of a method according to the invention.

FIG. 3 shows the three principal steps for the update of the ECU 1. In step 1000 the ECU 1 is running using the runtime system 22. For example, different applications are performed using the guest systems 24, 26, 28, 30. In a next step 1010 one or more files or data segments, for example an image file, are downloaded and provided to the update system 24.

Then, in step 1100 the ECU 1 is updated, for example by overwriting the memory 19, by the update system. 24 According to an embodiment, the ECU 1 is adapted such that only the update system 24 is allowed to update the ECU 1. In other words, the update system 24 has the privilege to flash any software update.

Figure 4:
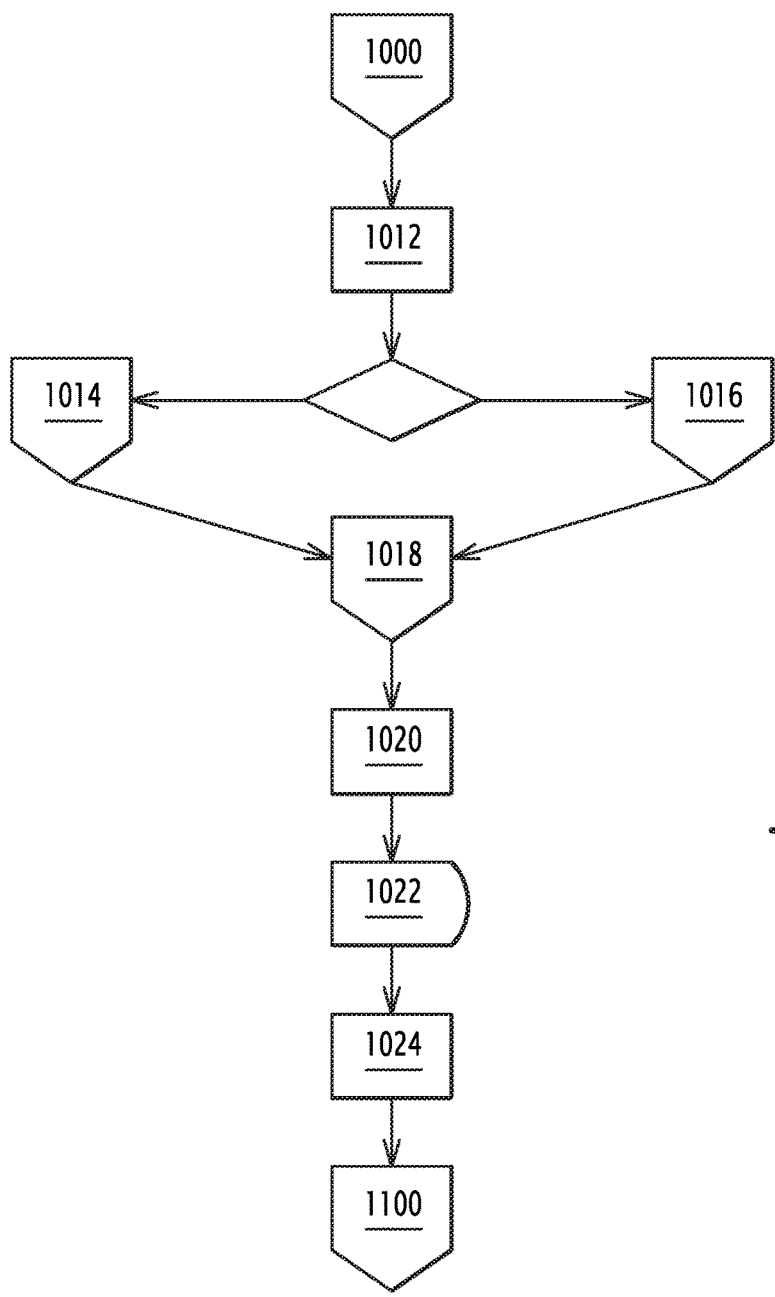
FIG. 4 shows schematically a flow chart of a detailed portion of the steps of the method of FIG. 3.

FIG. 4 shows in more detail the process for downloading the one or more update files or data segments according to the invention. In step 1012 one or more update clients 38, 40, 42 are started. In a next step, either a user initiates an update (step 1014) or a remote server 44, 46, 48 initiates (step 1016) the update. For example, the user of the automotive vehicle might select via a respective menu to update the ECU 1. According to another example, the vehicle manufacturer or the automotive supplier may initiate the update.

In the next step 1018, the update client 38, 40, 42 may download the one or more update files or data segments. The one or more update files or data segments are stored nontrusted memory areas, for example in the memory 5, which could be accessed by both the trusted and the untrusted guest systems 24, 26, 28, 30. According to an embodiment, the update clients 38, 40, 42 verify the version of the one or more update files or data segments and/or the status.

According to an embodiment the update clients 38, 40, 42 verify whether the one or more update files or data segments are complete.

In step 1020 the system supervisor server 34 receives a reboot signal. For example a remote server 44, 46, 48 may send a reboot signal. In such a case, the reboot signal is received from the remote server 44, 46, 48 by one of the guest systems 26, 28, 30 and forwarded via in IPC link to the trusted guest system 24. In another embodiment, the user of the automotive vehicle triggers the reboot signal. Thus, in an embodiment, the reboot signal is not triggered automatically by the runtime system 22, it is triggered from the outside of the ECU 1.

In the optional step 1022, the system supervisor server 34 introduces a delay, before it signals to the ECU hardware and the bootloader 20 to reboot.

In an embodiment, the system supervisor server 34 verifies, whether the one or more rules are fulfilled, i.e. they allow a reboot and an update. For example, the system supervisor server 34 verifies whether the engine of the vehicle has stopped, the vehicle is parked etc.

In case the rules or conditions are fulfilled, the system supervisor server 34 signals to the ECU hardware and the bootloader 20 to reboot.

In step 1024, the system supervisor informs the bootloader 20 to reboot in the update system 24. Then the ECU 1 is rebooted and the update system 24 is started.

Figure 5:
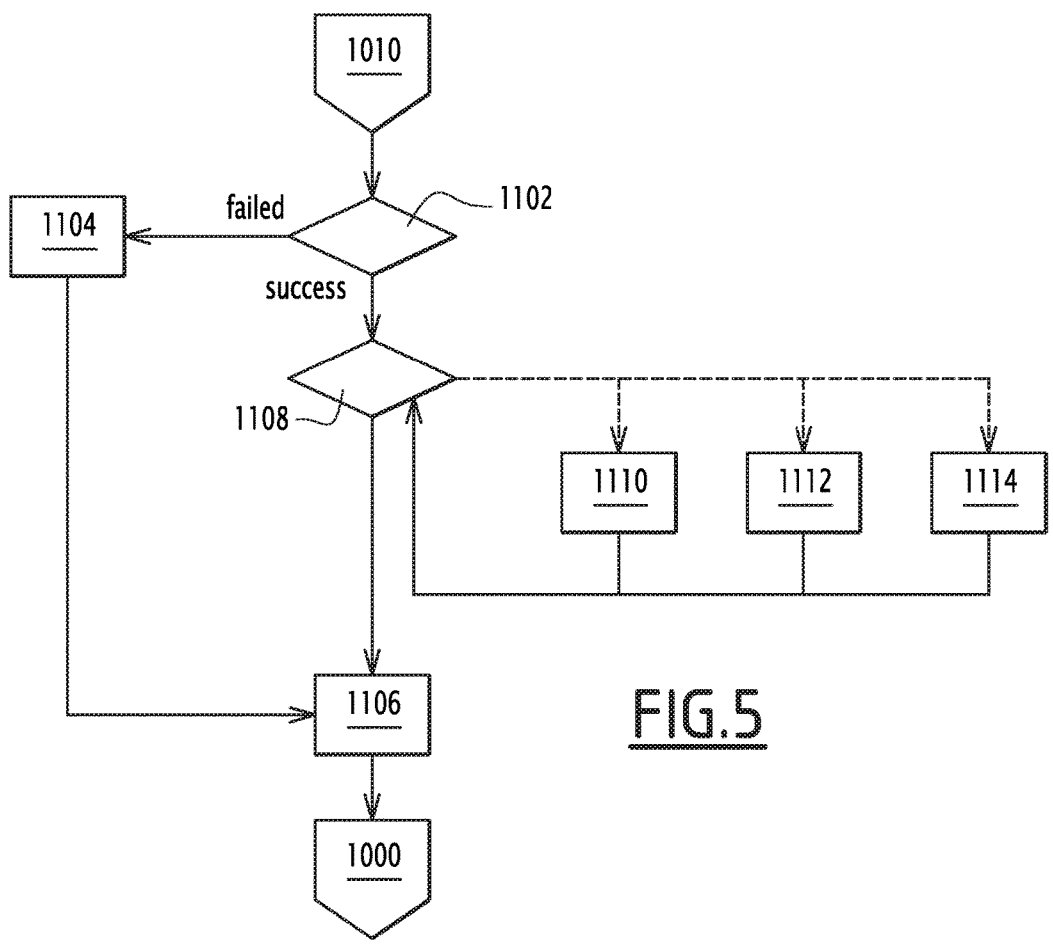
FIG. 5 shows schematically a flow chart of a detailed portion of the steps of the method of FIG. 3.

FIG. 5 shows schematically a flow chart of a detailed portion of the steps of the method of FIG. 3, in particular relating to the update process.

After the update operating system 58 has been started, the update manager 64 applications are started. In a first step 1102 the update manager 64 reads the one or more update files or data segments from the untrusted memory 5. Then, the update manager 64 verifies the one or more update files or data segments.

In case the verification fails, in step 1104 the update process is aborted and a signal is send to the system supervisor server 60 to reboot the ECU using the runtime system 22. The system supervisor server 60 configures accordingly the bootloader 20, and in step 1106 the reboot is performed using the runtime system 22.

If the verification in step 1102 is successful, the installation of the one or more files or data segments begins in step 1108. For that purpose, the update manager 64 runs in step 1110 the microcontroller unit (MCU) installer 66, in step 1112 the flash installer 70 and/or in step 1114 the file system installer 72. The number of updates to be performed depends on the number and on the type of the one or more update files or data segments. Steps 1110, 1112, 1114 are repeated as often as necessary to perform all updates.

According to an embodiment, only portions of the runtime system 22 are updated. For example, the update system 24 and the bootloader 20 may not be updatable.

Then, the system supervisor server 60 configures accordingly the bootloader 20, and in step 1106 the reboot is performed using the runtime system 22.

Figure 6:
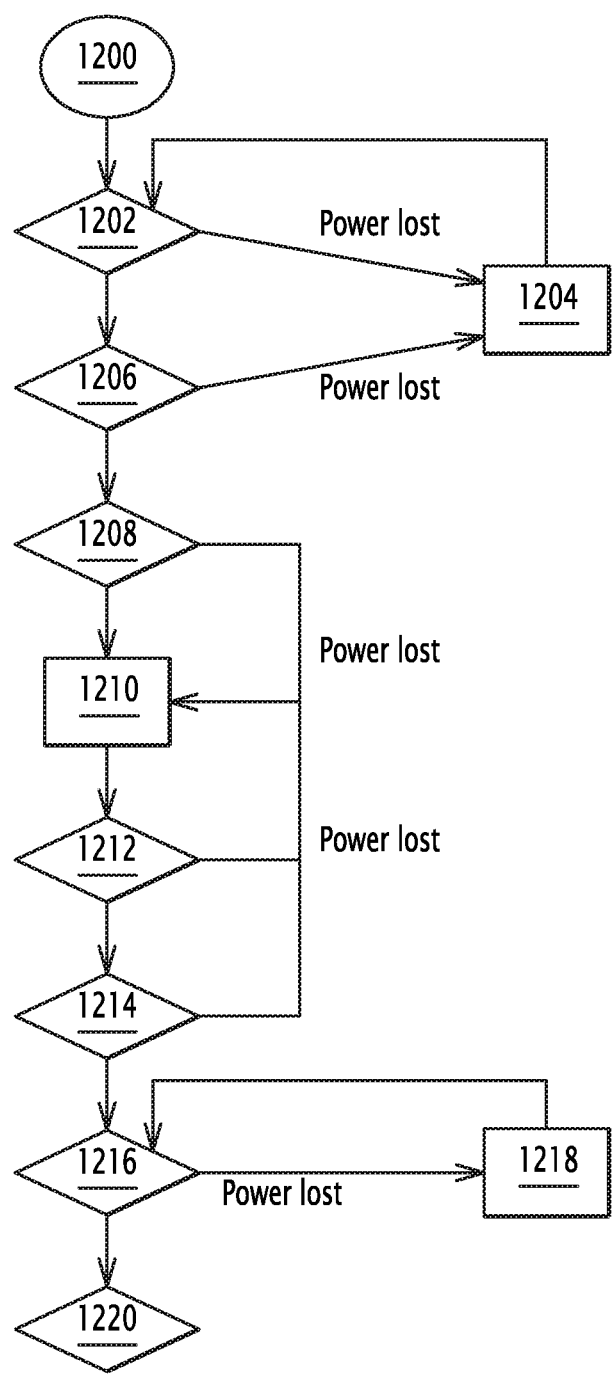
FIG. 6 shows schematically the behavior of the system upon a power failure during an update process.

FIG. 6 shows schematically the behavior of the system upon a power failure during an update process.

In step 1200, the ECU is running using the runtime system 22. When a user of the automotive vehicle and or a remote server 44, 46, 48 requests an update, one or more of the guest systems 26, 28, 30 initialize an update, using one or more of the update clients 38, 40, 42 (step 1202). The one or more update clients 38, 40, 42 communicate with one or more of the remote servers 44, 46, 48. According to an embodiment, the download clients 38, 40, 42 verify the version of the one or more update files or data segments and/or the status. When a power loss occurs at step 1202, the ECU 1 will reboot in step 1204 in the runtime system 22. The one or more update clients 38, 40, 42 will again initialize the update according to step 1202.

If the step 1102 is successful completed, the method proceeds to step 1206 in which the download is performed by one or more update clients 38, 40, 42 and the completeness of the one or more files or data segments is verified. When a power loss occurs at step 1206, the ECU will reboot in step 1204 in the runtime system 22. The one or more update clients will again initialize the update according to step 1202.

If the one or more files or data segments are successfully stored in the untrusted memory 5 and the reboot signal is received so that the system supervisor server 34 has already configured the bootloader 20 to boot in the update system 24 (step 1208), a power loss would also result in a reboot into the update system 24, step 1210, as during normal functioning. In other embodiments, the system supervisor server 34 only configures the bootloader 20 to boot into the update system 24, when the one or more rules are fulfilled, e.g. allow a reboot. In other words, the reboot allowed in dependence of the one or more rules.

The next step 1212 concerns the verification of the one or more files or data segments, the unpacking of the one or more files or data segments, and the content check of the one or more files or data segments by the update manager 64 as already detailed here-above.

In step 1214 the installers 66, 68 and 72 are run, as detailed above.

A power loss during the steps 1212 and 1214 would result in a reboot of the ECU 1 in the update system 24 in step 1210, as the bootloader has not yet been modified to boot in the runtime system 22, so that the steps 1212 and 1214 are repeated.

In step 1216, the installation is verified after the writing of one or more update files or data segments in the respective memory areas. If power loss occurs during the steps 1216, the ECU 1 would be rebooted in step 1218 in the update system 24, and subsequently step 1216 would be repeated.

In step 1220, the system supervisor server 60 configures the bootloader 20 to start the runtime system 22, and the ECU is rebooted into the runtime system 22.

Figure 7:
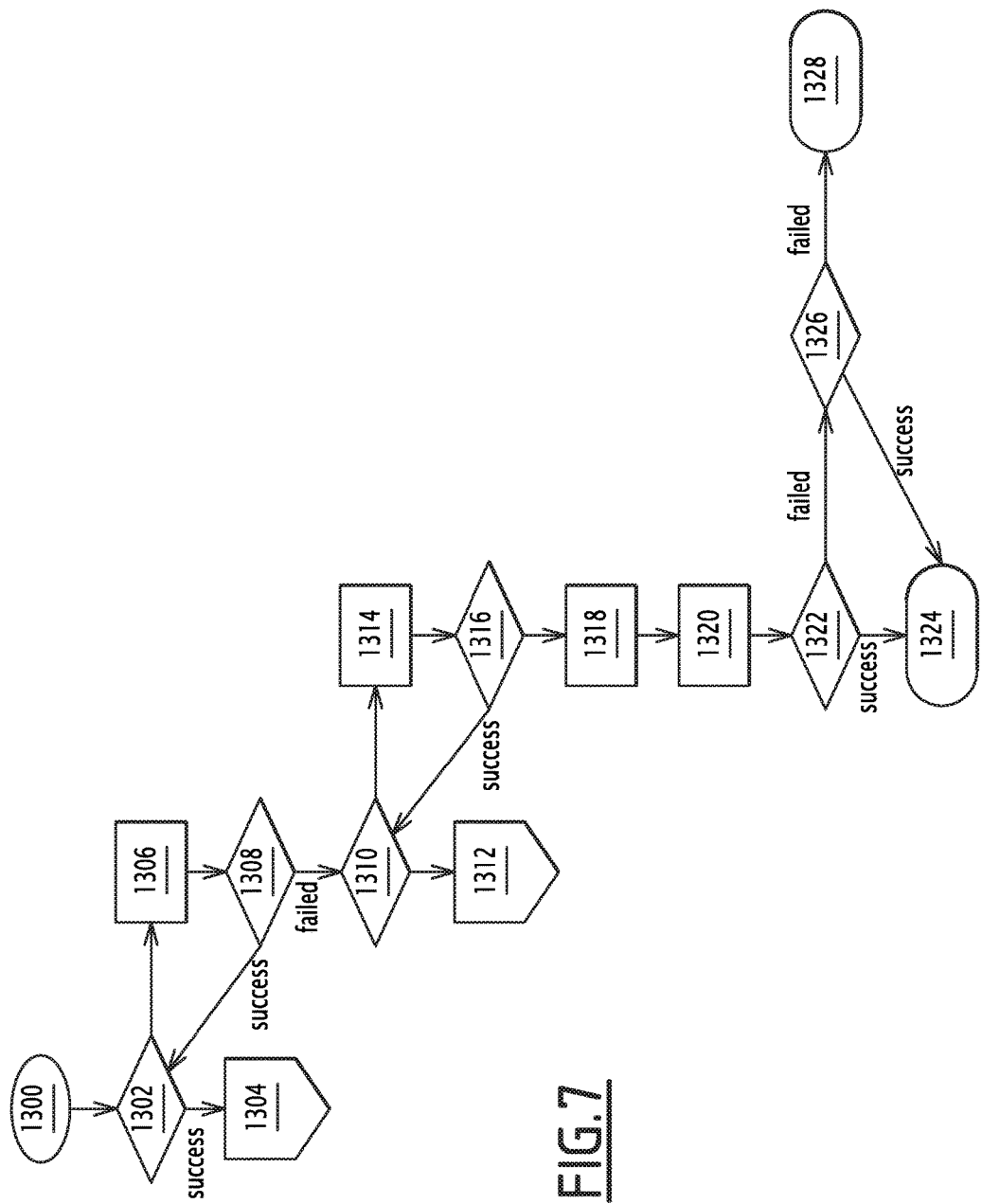
FIG. 7 shows schematically the behavior of the system upon a failure during download of one or more files or data segments.

FIG. 7 shows schematically in a flow chart the behavior of the system upon a failure during download of one or more files or data segments. In step 1300 the ECU 1 is running using the runtime system 22.

In step 1302, a user of the automotive vehicle and or a remote server 44, 46, 48 requests to initiate an update using the update client 38 of a first untrusted guest system 26. If the initialization is successful, the download of one or more files or data segments starts at step 1304.

In case the update client 38 is terminated by an unknown reason, step 1306, the first untrusted guest system 26 tries to restart the update client 38 (step 1308). In case the restart is successful, the process continues at step 1302.

In case the restart of the update client 38 fails, the backend server requests to initiate an update using the update client 40 of the second untrusted guest system 28 at step 1310. For example, the second untrusted guest system 28 is different from the first untrusted guest system 26.

If the initialization is successful, the download of one or more files or data segments starts at step 1312.

In case the update client 40 is terminated by an unknown reason, step 1314, the second untrusted guest system 28 tries to restart the update client 40 (step 1316). In case the restart is successful, the process continues at step 1310.

In case the restart of the update client 38 fails, step 1318, the user is warned, for example about needed maintenance. The automotive vehicle may be driven into a maintenance facility or garage for the automotive vehicle, step 1320.

Then, the guest system 30, for example the automotive operating system, with the update client 42 is initiated to download the one or more files or data segments from the remote server in step 1322. Typically an automotive operating system and its update client 42 is highly reliable. If the download is successful, in step 1324 the update of the ECU 1 is successfully performed.

In case the update using the guest system 30 fails, in step 1326, the one or more files or data segments are downloaded using the update client 78 of the update system 24. If the download is successful, the process continues in step 1324.

If the update using the update system fails in step 1326, in step 1328 an update is performed using an emergency mechanism of the bootloader 20.

The method and control unit 1 disclosed herein uses four mechanisms: separation, secure boot, redundancy, pulling updates. Further, the update system 24 is a separated software component without a direct connection to any remote server. It also is the only software component with the privilege to perform the update. This behavior keeps the attack vector as small as possible.

The software update clients 38, 40 that download update data from remote servers are distributed and separated into different (possibly untrusted) guest systems to move the attack surface to these guest systems.

All critical components of the software update solution are booted via secure boot. This especially includes: bootloader 20, virtualization layer 32, 56 (if existing), the trusted guest system 24 including the ECU system supervisor server, the update system 24, 58. Using secure boot ensures that the critical software components have not been altered and data from these systems can be trusted.

Multiple redundant software update clients 38, 40, 42 that download update data from remote servers allow for the failure of single software update client while still maintaining the ECU 1 in a state where update data can be received.

According to an embodiment, a virtualization layer 32 is be used to allow multiple systems to run, each including a software update client.

Further, the one or more update files or data segments are stored into an untrusted memory 5 by the untrusted software update clients that receive the files or data segments. These files or data segments are pulled into the update process later on by the trusted update system 24. This ensures that untrusted software update clients cannot change any critical memory areas.

Figure 8:
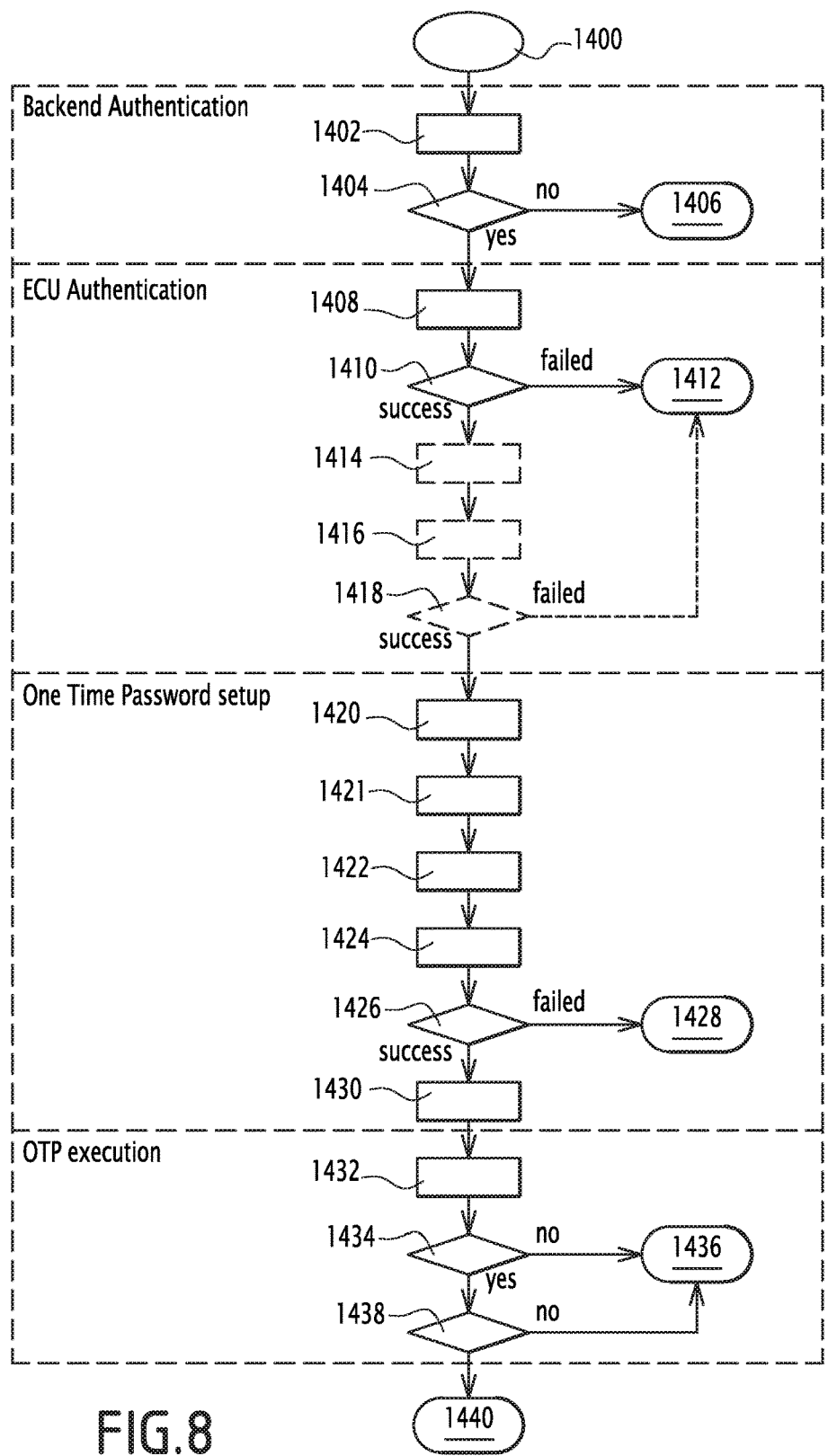
FIG. 8 shows the process of sending a trusted signal from a backend to a system supervisor server of the ECU.

FIG. 8 shows the process of sending a trusted signal from a remote server 44, 46, 48 to the system supervisor server 34 of the ECU 1.

As it can be seen from FIG. 8, the system supervisor server 34 is adapted to receive signals from a connected MCUs or one or more external remote servers 44, 46 over a network. These signals are fed into the system supervisor state machine, in particular of the system supervisor server 34, to change the ECU states. The signals may come through untrusted application components of the untrusted guest systems 26, 28 and networks using inter partition communication. The untrusted guest operation systems 26, 28 use their communication clients to communicate with the remote servers 44, 46.

As already detailed above the trusted guest system or partition 24 is isolated against inspection and interference from the untrusted guest systems 26, 28 in terms of memory and CPU time.

According to an embodiment, signals that are sent to the system supervisor server 34 from a backend server 44, 46 or another client in a network are encrypted. Thus man-in-the-middle attacks from untrusted guest partitions or networks. For example an encrypted connection may use a public key signature, e.g. using an asymmetric key encryption. For that purpose, the signal crypto module 35 is adapted to verify the public key whether the public key comes from a trusted certificate authority which is stored in the trusted memory 17.

For example, as it will be detailed below, each signal is further encrypted with a one-time password. For that purpose, the crypto module 35 generates a random shared secret and provides it to the remote server 44, 46. Thus the remote server 44, 46 may create a one-time password for encrypting signals, like reboot signals. This mechanism prevents replay attacks of signals (e.g. reboot signals).

According to other embodiments, also the one or more update files or data segments may be encrypted.

As already discussed here-above, the keys for encryption and decryption are stored in the trusted memory 17 that is only accessible for a trusted guest system 24, and eventually trusted guest system 30, if it is booted in a chain of trust.

At step 1400, a remote server 44, 46 decides to execute a trusted signal, for example a reboot signal, for the ECU 1.

At step 1402, the remote server 44, 46 sends his signed public key to the trusted guest system 24, in particular to the crypto module 35. The signal is send via an untrusted guest system 26, 28, as the trusted guest system 24 including the crypto module 35 has no direct connection to the remote server 44, 46.

In step 1404, the crypto module 35 checks whether the public key is signed by a trusted certificate authority (CA), which have been stored in the trusted memory 17, for example a read only memory.

If the public key does not come from a trusted CA, the crypto module 35 terminates the authentication at step 1406.

In case the public key comes from a trusted CA, the crypto module 35 sends his signed public key certificate to the remote server 44, 46 (step 1408).

The remote server 44, 46 also verifies in step 1410, whether the public key certificate was signed by a trusted CA.

If the public key does not come from a trusted CA, the backend server 44, 46 terminates the authentication at step 1412.

In an optional step 1414, the crypto module 35 gathers and signs in step 1416 a hash from an anti-theft module of the automotive vehicle, and transfers the signed hash to the remote server 44, 46.

The remote server 44, 46 verifies in the optional step 1418 the integrity and the value of the anti-theft device hash and terminates the authentication if the verification fails in step 1412.

In the next steps the one-time password is set up. For that purpose, the crypto module 35 generates a random secret (step 1420) and encrypts the shared secret with the public key of the backend in step 1421.

Then, the crypto module 35 signs in step 1422 configuration data for the one time password (OTP), namely the shared secret and a seed with its own private key. For that purpose, the crypto module 35 reads the private key from the trusted memory 17.

In step 1424, the crypto module 35 sends the encrypted and signed configuration data via the IPC link and an untrusted guest system 26, 28 to the respective remote server 44, 46.

The remote server 44, 46 verifies the signature and content of the configuration data for the OTP in step 1426.

If the verification fails, the remote server 44, 46 terminates the setup of the OTP at step 1428.

If the verification is successful, the remote server 44, 46 initializes its own OTP generator using the configuration data at step 1430.

If the setup of the one-time password is finished, the remote server 44, 46 may send a signal using the OTP. For that purpose, the remote server 44, 46 signs the signal, for example a reboot signal, including the OTP and sends it to the crypto module 35 via an untrusted guest system 26, 28 (step 1432). The untrusted guest system 26, 28 forwards the signal via an IPC link to the crypto module 35.

In step 1434, the crypto module 35 checks if the signal is signed with the same public key as used for the OTP exchange. If this is not the case, the signal is blocked by the crypto module 35 at step 1436.

If the check in step 1434 is successful, the crypto module 35 checks whether the OTP is correct at step 1438. If the OTP is not correct, the signal is blocked by the crypto module 35 at step 1436.

If the OTP is not correct, the signal is forwarded by the crypto module 35 to the system supervisor server 34. The system supervisor server 34 executes the signal and, and for example reboots the ECU 1.

According to another embodiment, the communication end point at the ECU side is put into a second trusted guest system 30. In such a case the crypto module 35 is arranged in the second trusted guest system and communicates with the system supervisor server 34 via an IPC link. For example a second trusted guest system 30 may be an automotive operating system, like the one described here-above, that is booted using secure boot or a chain of trust. From this second trusted guest system 30 the signals could also be transferred to the ECU system supervisor server 34 without risking the validity of the data.

The solution isolates the ECU system supervisor server 34 from inspection and interference. It prevents that the application software can influence the behavior of the ECU system supervisor server.

Figure 9:
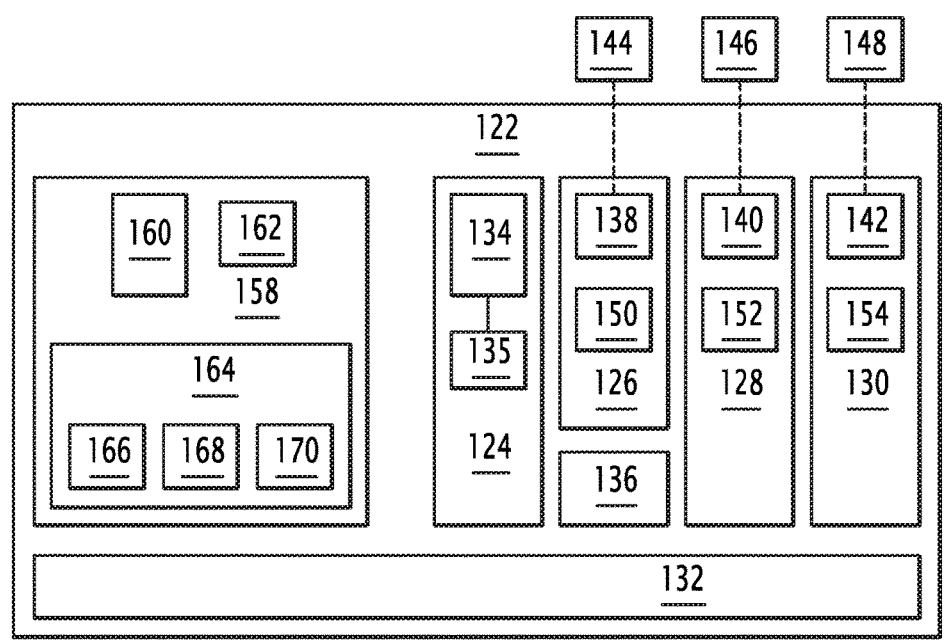
FIG. 9 shows schematically another system according to an embodiment of the invention.

The solution adds security for specific signals or files, like the update files or data segments, that are transferred from a network client, for example the remote server 44, 46, 48 to the system supervisor server 34 over an untrusted network or untrusted guest systems, to prevent replay attacks, man-in-the-middle attacks and/or unauthorized reading the content of the signals FIG. 9 shows another embodiment according to the invention. The same features are designated with the same reference numbers as in FIG. 2 increased by 100. Only the differences with respect to FIG. 2 are explained in more detail with respect to this embodiment.

In this embodiment, the ECU 1 only comprises a runtime system 122. In this exemplary embodiment, five guest systems are running on a virtualization layer 132, namely an update operating system 158, the trusted guest system 124, and the guest systems 126, 128, 130 comprising respectively one or more update clients 138, 140, 142. However, the number of guest system is not limited to five.

The update operating system 158 has substantially the same elements as the update operating system 58 of FIG. 2.

Further, according to an embodiment, the update operating system 158 is booted in a chain of trust.

In this case, a system supervisor server 134 is adapted to boot the update operating system 158 on the virtualization layer 132 and/or to inform the update operating system 158 that at least one update files or data segments have to be installed.

For example, the system supervisor server 134 may receive an update command in a signal. This signal may be verified, for example as in other embodiments disclosed herein. Then, the system supervisor server 134 boots the update operating system 158 or informs the update operating system to install at least at least one update files or data segments have to be installed. The installation of the one or more update files or data segments is performed like in other embodiments disclosed herein.

In an embodiment, which may be combined with other embodiments disclosed herein, the system supervisor server 134 verifies, whether the one or more rules are fulfilled, i.e. they allow an update. For example, the system supervisor server 134 verifies whether the engine of the vehicle has stopped, the vehicle is parked etc.

In case the rules or conditions are fulfilled, the system supervisor server 134 boots the update operating system 158 or informs the update operating system to install at least at least one update files or data segments have to be installed.

In the embodiment of FIG. 9 a reboot is not necessarily needed, as the update operating system 158 and the guest systems 126, 128, 130, which are downloading the one or more update files or data segments are running on the same virtualization layer 132.

The invention claimed is:

1. Method for updating an electronic control unit (ECU) for an automotive vehicle, the ECU comprising a runtime system with a virtualization layer adapted to run on a processor, the virtualization layer being adapted to assign processor time and memory space to a plurality of guest systems running on the virtualization layer in the ECU, the plurality of guest systems comprising a first trusted guest system and a first untrusted guest system, wherein the first trusted guest system runs a system supervisor server that provides the state of the ECU and/or of the other guest systems to the guest systems, wherein, in particular, the states of the ECU include one or more states of the automotive vehicle, one or more states of a system that the ECU is part of, or one or more states of other devices of the system or the automotive vehicle that the ECU is part of, the method comprising:

downloading, by a first update client of the first untrusted guest system running on the virtualization layer in the ECU of said automotive vehicle, one or more first update files or data segments from a first remote server;

storing, by the first update client, the one or more first update files or data segments in an untrusted memory in the ECU of said automotive vehicle accessible to the first untrusted guest system;

running an update operating system in the ECU of said automotive vehicle adapted to update one or more files or data segments of the ECU;

retrieving, by the update operating system layer in the ECU of said automotive vehicle, the one or more first update files or data segments from the untrusted memory; and updating the one or more files or data segments of the ECU in the ECU of said automotive vehicle.

2. Method according to claim 1, wherein the method further comprises:

initiating a reboot, by the first trusted guest system running on the virtualization layer; and after reboot, starting an updating system comprising the update operating system.

3. Method according to claim 1, wherein the method further comprises:

downloading, by a second update client of a second untrusted guest system running on the virtualization layer, one or more second update files or data segments from a second remote server or the first remote server;

storing, by the second update client, the one or more second update files or data segments in the untrusted memory;

retrieving, by the updating operating system, the one or more second update files or data segments from the untrusted memory; and selecting, by the update operating system, the one or more files or data segments to be used for the update from the one or more first update files or data segments and the one or more second update files or data segments.

4. Method according to claim 1, wherein the method further comprises before downloading, by the first untrusted guest system, one or more first update files or data segments:

initiating a download of one or more first update files or data segments by a second update client of a second untrusted guest system, upon failure to download one or more update files or data segments by a second untrusted guest system, initiating a download of the one or more first update files or data segments by the first untrusted guest system.

5. Method according to claim 1, wherein said updating one or more files or data segments of the ECU comprises updating one or more files or data segments of the runtime system and/or update operating system.

6. Method according to claim 1, further comprising verifying, by the updating operating system, the one or more first and/or second update files or data segments.

7. Method according to claim 1, wherein a reboot of the ECU is initiated by the first trusted guest system of the ECU after reception of a reboot signal, the method further comprising:

receiving, by the first trusted guest system, the reboot signal from a remote server or a boot of the update operating system on the virtualization layer is initiated by the first trusted guest system of the ECU after reception of an update command, the method further comprising receiving, by the first trusted guest system, the update command from a remote server.

8. Method according to claim 7, wherein the first trusted guest system communicates to the remote server via one of the first or second untrusted guest systems.

9. Method according to claim 7, wherein the first trusted guest system communicates to the remote server via one of the first or second untrusted guest systems via an encrypted communication channel.

10. Method according to claim 1, wherein one or more signals received by the first trusted guest system are encrypted by the remote server and decrypted by the first trusted guest system.

11. Method according to claim 10, further comprising:

generating a shared secret by the first trusted guest system;

sending the shared secret to the remote server;

receiving, by the first trusted guest system, the one or more signals encrypted with a one-time password based on the shared secret;

verifying, by the first trusted guest system, whether one-time password is correct; and, if the one-time password is correct, executing the signal command.

12. Method according to claim 10, wherein the one or more signals are the reboot signal or the update command.

13. Method according to claim 10, wherein the one or more signals are encrypted with a one-time password.

14. Method according to claim 1, wherein the first trusted guest system runs a system supervisor server, the system supervisor server having a privilege to reboot the ECU.

15. Computer program product comprising non-transitory computer readable mediums storing commands for executing when loaded and executed on a processor, a method for updating a an electronic control unit (ECU) for an automotive vehicle, the ECU comprising a runtime system with a virtualization layer adapted to run on the processor, the virtualization layer being adapted to assign processor time and memory space to a plurality of guest systems, the plurality of guest systems comprising a first trusted guest system and a first untrusted guest system, wherein the first trusted guest system runs a system supervisor server, the system supervisor server providing the state of the ECU and/or of the other guest systems to the guest systems, wherein, in particular, the states of the ECU include one or more states of the automotive vehicle, one or more states of a system which the ECU is part of, or one or more states of other devices of the system or the automotive vehicle the ECU is part of, the method comprising:

downloading, by a first update client of a first untrusted guest system running on the virtualization layer in the ECU of said automotive vehicle, one or more first update files or data segments from a first remote server;

storing, by the first update client, the one or more first update files or data segments in an untrusted memory in the ECU of said automotive vehicle accessible to the first untrusted guest system;

running an update operating system adapted to update one or more files or data segments of the ECU of said automotive vehicle;

retrieving, by the update operating system in the ECU of said automotive vehicle, the one or more first update files or data segments from the untrusted memory; and updating the one or more files or data segments of the ECU of said automotive vehicle.

16. Electronic control unit (ECU) for an automotive vehicle comprising:

at least one central processing unit (CPU) connected to at least one untrusted memory;

a runtime system running on the ECU, the runtime system comprising a virtualization layer adapted to run on the CPU, the virtualization layer being adapted to assign processor time and memory space to a plurality of guest systems, the plurality of guest systems comprising a first trusted guest system and a first untrusted guest system;

the first trusted guest system running a system supervisor server, the system supervisor server providing the state of the ECU and/or of the other guest systems to the guest systems, wherein, in particular, the states of the ECU include one or more states of the automotive vehicle, one or more states of a system which the ECU is part of, or one or more states of other devices of the system or the automotive vehicle the ECU is part of;

the first untrusted guest system running on the virtualization layer in the ECU of said automotive vehicle, the first untrusted guest system comprising a download client and being adapted to download one or more first update files or data segments from a first remote server and to store the one or more first update files or data segments in the at least one untrusted memory in the ECU of said automotive vehicle accessible to the first untrusted guest system; and an update operating system adapted to retrieving, one or more first update files or data segments from the untrusted memory and to update one or more files or data segments of the ECU of said automotive vehicle.

* * * * *